(12) United States Patent
Leidy et al.

(10) Patent No.: US 6,446,788 B1
(45) Date of Patent: Sep. 10, 2002

(54) LINEAR CONVEYOR SPEED SENSOR

(75) Inventors: D. Wayne Leidy; Thomas R. Kirkman, both of Perrysburg; Adam W. Stienecker, Toledo, all of OH (US)

(73) Assignee: Owens-Brockway Glass Container Inc., Toledo, OH (US)

(*) Notice: Subject to any disclaimer, the term of this patent is extended or adjusted under 35 U.S.C. 154(b) by 0 days.

(21) Appl. No.: 09/803,816

(22) Filed: Mar. 12, 2001

(51) Int. Cl.[7] .............................................. B65G 43/00
(52) U.S. Cl. ................................. 198/502.4; 198/810.01
(58) Field of Search ........................... 198/370.11, 429, 198/430, 457.03, 457.06, 468.01, 493, 502.3, 502.4, 575, 577, 810.01–810.03

(56) References Cited

U.S. PATENT DOCUMENTS

| | | |
|---|---|---|
| 3,793,545 A | 2/1974 | Leiber et al. |
| 3,909,711 A | 9/1975 | Bauer et al. |
| 4,113,609 A | 9/1978 | King et al. |
| 4,193,784 A | 3/1980 | Mumford |
| 4,282,967 A * | 8/1981 | Boling et al. ............. 198/502.3 |
| 4,355,364 A | 10/1982 | Gudat |
| 4,366,897 A * | 1/1983 | Azuma et al. ............ 198/502.3 |
| 5,490,590 A * | 2/1996 | Courtney ................. 198/502.4 |
| 5,614,063 A | 3/1997 | Graf et al. |
| 5,923,165 A | 7/1999 | Horita et al. |
| 6,076,654 A | 6/2000 | Leidy |
| 6,100,680 A | 8/2000 | Vig et al. |

\* cited by examiner

Primary Examiner—Joseph E. Valenza

(57) ABSTRACT

A glass machine system in accordance with presently preferred embodiments of the invention includes a glassware manufacturing machine for manufacturing articles of glassware and transferring the articles to a linear conveyor, at least one linear chain conveyor for receiving and transporting such articles from the machine, and a speed sensor for monitoring linear speed of the conveyor. The speed sensor includes a magnetic energy source, a magnetic energy sensor and bracketry mounting the source and sensor adjacent to the conveyor. The chain conveyor teeth affect magnetic energy coupling between the source and sensor as the conveyor passes adjacent to the sensor. Electronic circuitry is responsive to signals from the sensor for determining linear speed of the conveyor and maintaining a constant linear speed at the conveyor.

10 Claims, 6 Drawing Sheets

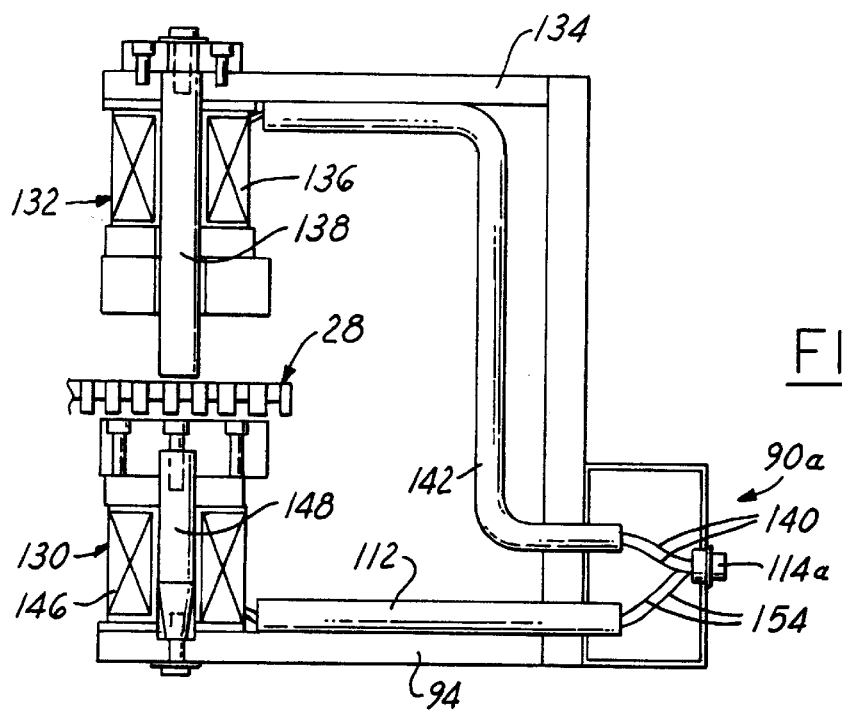
FIG. 7
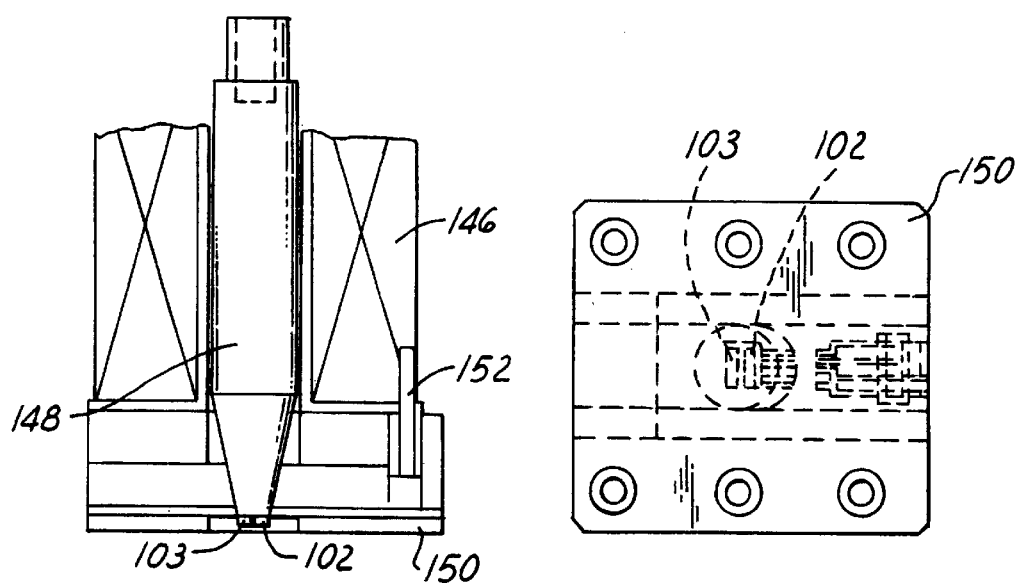
FIG. 8
FIG. 9

LINEAR CONVEYOR SPEED SENSOR

The present invention is directed to transport of glassware on a linear conveyor from a glassware manufacturing machine to an annealing lehr or other post-manufacturing stage, and more particularly to monitoring speed of the linear conveyor.

BACKGROUND AND OBJECTS OF THE INVENTION

The science of glass container manufacture is currently served by the so-called individual section machine. Such a machine has a plurality of separate or individual manufacturing sections, each of which has a multiplicity of operating mechanisms for converting one or more charges or gobs of molten glass into hollow glass containers and transferring the containers through successive stations of the machine section. Each machine section includes one or more blank molds in which a glass gob is initially formed in a pressing or blowing operation, an invert arm for transferring the blanks to blow molds in which the containers are blown to final form, tongs for removing the formed containers onto a deadplate, and a sweepout mechanism for transferring molded containers from the deadplate onto a conveyor. U.S. Pat. No. 4,362,544 includes a background discussion of both blow-and-blow and press-and-blow glassware forming processes, and discloses an electropneumatic individual section machine adapted for use in either process.

As shown in U.S. Pat. No. 4,193,784, the individual machine sections operate in synchronism but out of phase with each other to form the glass containers and place the containers in sequence onto a linear machine conveyor. Containers on the linear machine conveyor are transferred to a linear cross conveyor, from which the containers are loaded into an annealing lehr. The sweepout stations of the individual machine sections are timed to transfer the finished containers to the machine conveyor such that the containers are in spaced groups, within which the containers are at uniform spacing from each other. Each group is transferred simultaneously to the annealing lehr. It is important to maintain a constant speed at the linear conveyors so that the containers will be at uniform spacing within each group, and the groups will be at uniform spacing with respect to each other, when they arrive at the lehr loader mechanism. U.S. Pat. No. 6,076,654 discloses a glass container handling system in which the linear machine conveyor and the linear cross conveyor are driven by associated electric motors coupled to a motor controller. A speed sensor is associated with each conveyor for providing an electrical signal to the controller indicative of conveyor speed. The control electronics controls operation of the motors to maintain the desired constant speed at each conveyor.

It is an object of the present invention to provide a glass machine system having sensors for sensing linear speed of the machine and/or cross conveyor, in which the sensor is constructed and arranged to accommodate wear at the conveyor while providing an accurate and reliable measure of conveyor speed.

SUMMARY OF THE INVENTION

A glass machine system in accordance with presently preferred embodiments of the invention includes a glassware manufacturing machine for manufacturing articles of glassware and transferring the articles to a linear conveyor, at-least one linear conveyor for receiving and transporting such articles from the machine, and a speed sensor for monitoring linear speed of the conveyor. The speed sensor includes a magnetic energy source, a magnetic energy sensor, and bracketry mounting the source and sensor adjacent to the conveyor. The conveyor affects magnetic energy coupling between the source and sensor as the conveyor passes adjacent to the sensor. Electronic circuitry is responsive to signals from the sensor for determining linear speed of the conveyor. The conveyor preferably takes the form of a chain conveyor having teeth along an undersurface for engaging a motor-driven pulley to drive the conveyor. The teeth are magnetically permeable, and passage of the teeth affects magnetic coupling between the energy source and energy sensor of the speed sensor. The control electronics preferably is coupled to the pulley drive motor for maintaining constant linear speed at the conveyor.

The conveyor speed sensor in the preferred embodiments of the invention includes a floating subassembly having at least one a roller for engaging an upper surface of the conveyor. The magnetic energy source and sensor are carried by the floating subassembly and disposed beneath the conveyor. In this way, constant spacing is maintained between the conveyor undersurface and the magnetic source/sensor arrangement against changes in vertical position of the conveyor due to wear of a plate over which the conveyor slides. The floating subassembly is slidable on rods carried in fixed position adjacent to the conveyor, and coil springs bias the roller(s) on the subassembly into engagement with the upper surface of the conveyor. The magnetic energy sensor in the preferred embodiments of the invention comprises a Hall sensor, although other conventional types of magnetic energy sensors may readily be employed. The magnetic energy source in the preferred embodiments of the invention comprises a permanent magnet or an electromagnet coupled to the electronic circuitry. A magnetic energy concentrator preferably is associated with the source and the sensor for concentrating passage of magnetic energy through the sensor to enhance responsiveness of the sensor to passage of conveyor drive teeth.

BRIEF DESCRIPTION OF THE DRAWINGS

The invention, together with additional objects, features and advantages thereof, will be best understood from the following description, the appended claims and the accompanying drawings in which:

FIG. 7 is a partially sectioned elevational view similar to that of FIG. 5 but illustrating a modified speed sensor in accordance with the present invention;

FIG. 8 is an enlarged view of a portion of FIG. 7;

FIG. 9 is a bottom plan view of the portion of the sensor illustrated in FIG. 8.

DETAILED DESCRIPTION OF PREFERRED EMBODIMENTS

The disclosures of above-noted U.S. Pat. Nos. 4,193,784 and 6,076,654 are incorporated herein by reference for purposes of background.

Figure 1:
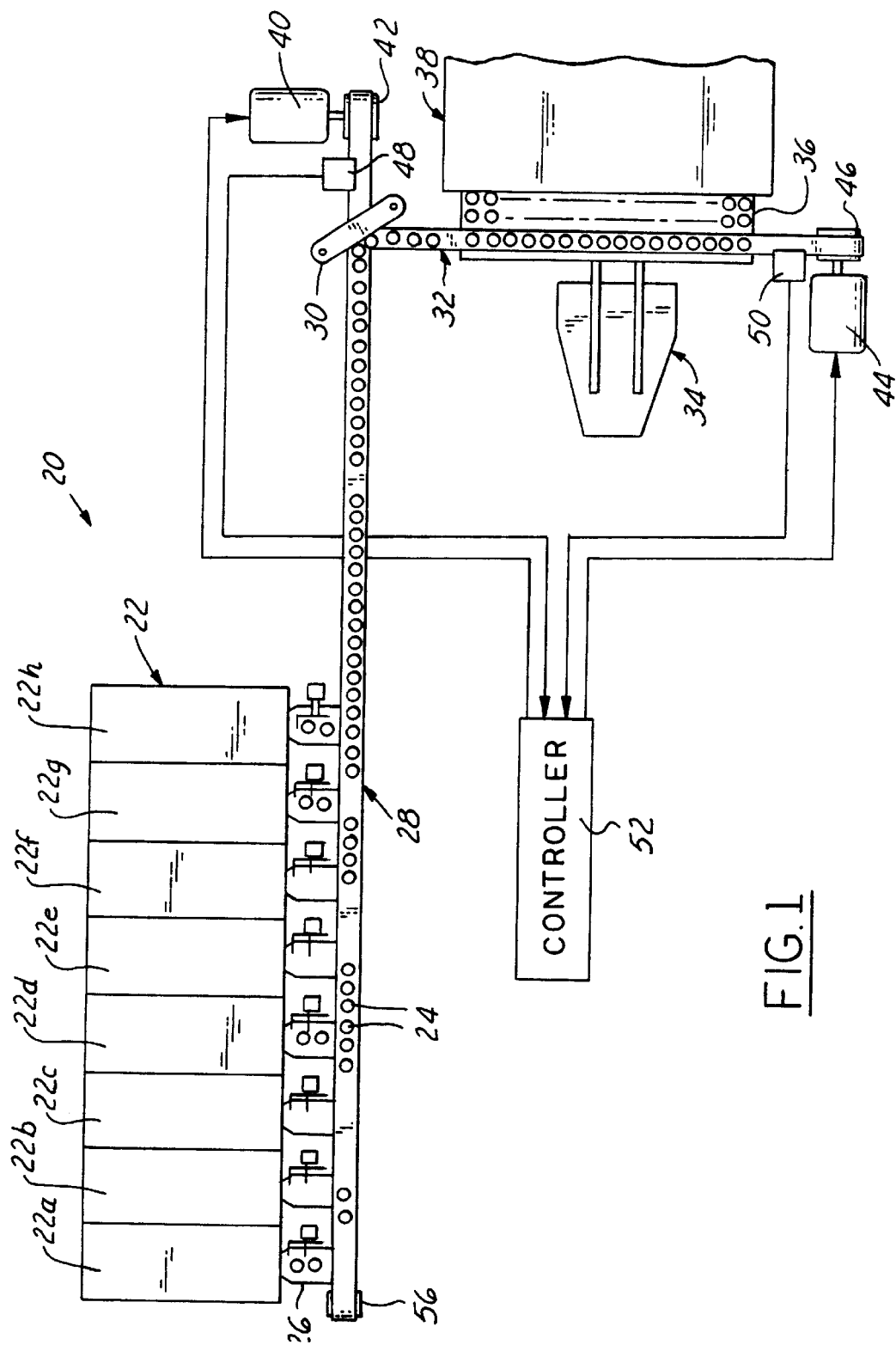
FIG. 1 is a schematic diagram of a glass manufacturing system in accordance with a presently preferred implementation of the invention.

FIG. 1 illustrates a glassware manufacturing system 20 as comprising an individual section machine 22 having a plurality of sections 22a–22h. Sections 22a–22h are generally identical to each other, and are operated in synchronism but out of phase with each other to convert gobs of molten glass into articles 24 of glassware, such as glass containers. Each machine section includes a sweepout station 26 at which the completed articles of glassware are transferred to a linear machine conveyor 28. The glassware is transported by conveyor 28 to a transfer device 30, at which the containers are transferred to a linear cross conveyor 32. Cross conveyor 32 transports the containers to a position adjacent to a lehr loader 34, which transfers the containers in groups onto the conveyor 36 of an annealing lehr 38. The sequence of operation of sweepout stations 24 is coordinated with conveyor speed, etc. so that the glassware articles 24 are transported in groups by conveyors 28, 32. The containers are preferably at uniform spacing within each group, and the groups are at a desired spacing with respect to each other. This spacing is such that the containers of each group may be loaded simultaneously by lehr loader 34 onto lehr conveyor 36, and the lehr loader bar has sufficient time to retract before the next group of containers is in position at the loader. Machine conveyor 28 is driven by an electric motor 40 and a drive pulley 42. Likewise, cross conveyor 32 is driven by an electric motor 44 and a drive pulley 46. A conveyor speed sensor 48 is positioned adjacent to conveyor 28 for sensing linear speed of the conveyor, and a conveyor speed sensor 50 is positioned adjacent to conveyor 32 for sensing speed of operation of that conveyor. Speed sensors 48, 50 provide respective inputs to an electronic controller 52, which is connected to motors 40, 44 for controlling speed of operation of the motors so as to obtain a desired substantially constant linear velocity at the respective conveyors.

Figure 3:
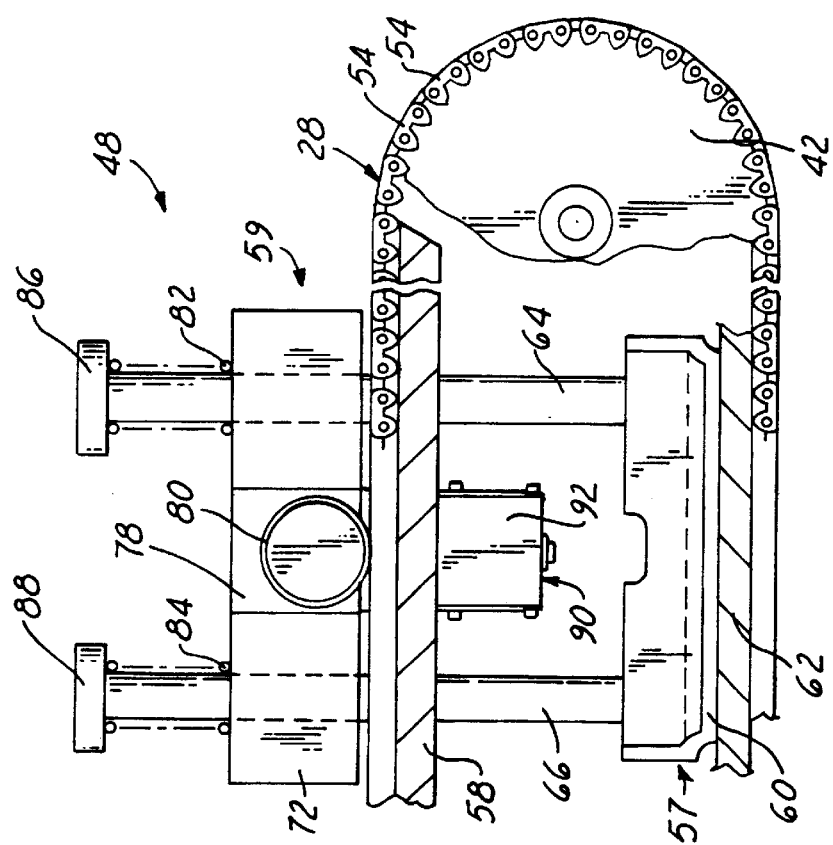
FIG. 3 is a partially sectioned end elevational view of the conveyor speed sensor illustrated in FIG. 2.
Figure 2:
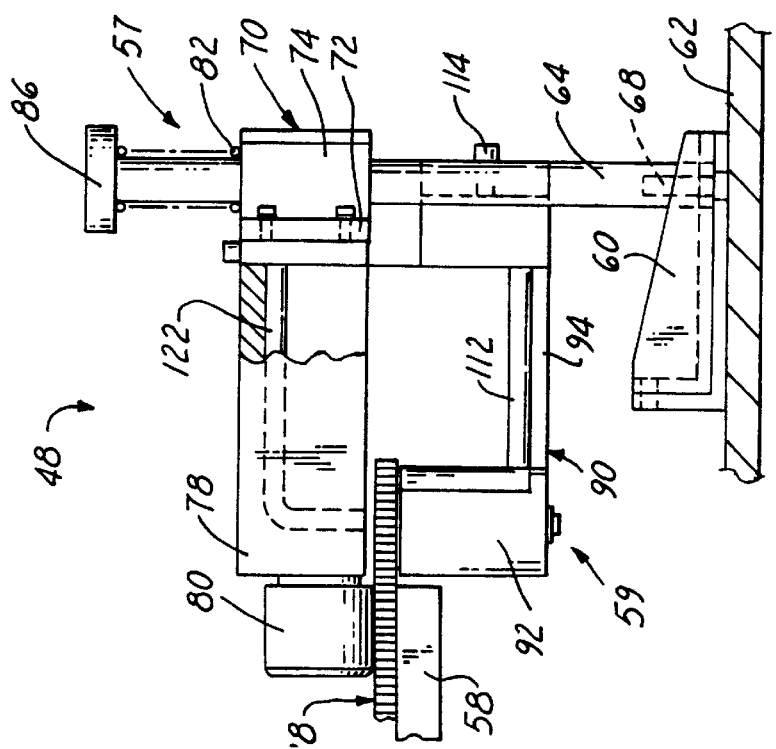
FIG. 2 is a side elevational view of a conveyor speed sensor in the system of FIG. 1.
Figure 4:
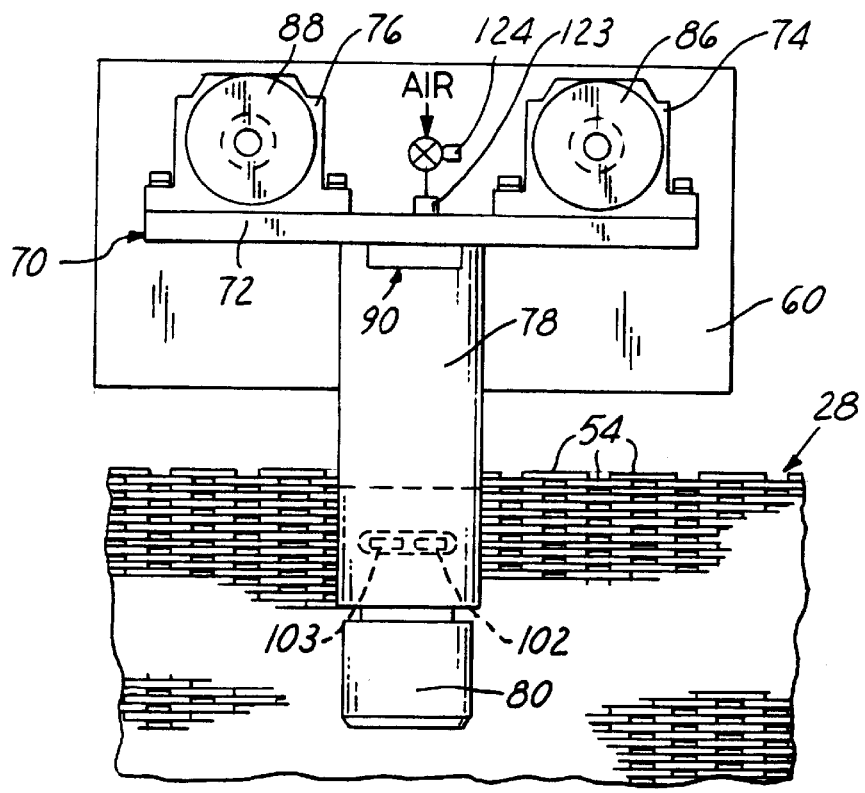
FIG. 4 is a top plan view of the sensor illustrated in FIGS. 2 and 3.
Figure 5:
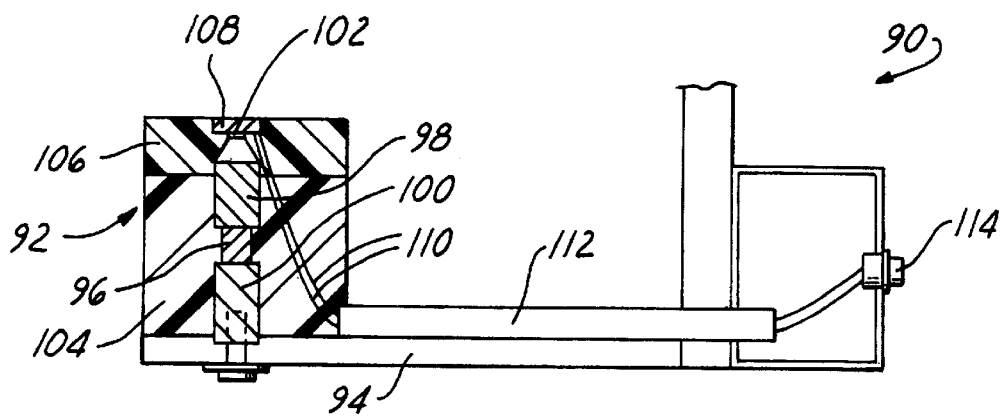
FIG. 5 is a partially sectioned elevational view of a portion of the speed sensor illustrated in FIGS. 2–4.

FIGS. 2–5 illustrate the construction of speed sensor 48 associated with machine conveyor 28. It will be understood, however, that speed sensor 50 associated with cross conveyor 32 is preferably identical to speed sensor 48. Referring to FIGS. 2–4, machine conveyor 28 preferably comprises a chain-type conveyor having a plurality of pivotally interconnected links 54. Links 54 are of magnetically permeable construction, such as steel. It will be understood, however, the invention may be employed in conjunction with other types of conveyors with magnetically permeable teeth, such as drive belts having strengthening metal inserts. Each link 54 has a pair of teeth that laterally align in assembly with the teeth of laterally adjacent links. These teeth engage the teeth of drive pulley 42 coupled to motor 40 (FIG. 1) to drive the conveyor. The conveyor is an endless conveyor, being trained around an idler pulley 56 (FIG. 1) at the opposing end of the conveyor. The upper reach of the conveyor slides along a wear plate 58 for supporting the weight of the conveyor and the articles of glassware carried by the conveyor. Friction between the undersurface of chain links 54 and the upper surface of plate 58 can cause wear of the plate, altering the vertical position of the conveyor. Wear of the chain link teeth and/or the pulley teeth also changes the effective radius of drive pulley 42, which in turn changes the linear speed of the conveyor given a constant input from motor 40. Speed sensor 48 in accordance with the present invention accommodates change in vertical position of conveyor 28 due to wear at plate 58 and/or the undersurface of conveyor 28, and provides a measure of conveyor linear speed to control electronics 58 so that the electronics can control operation of motor 40 to maintain a constant linear velocity at the conveyor.

Speed sensor 48 includes a first fixed subassembly 57 and a second subassembly 59 that floats on subassembly 57. Fixed subassembly 57 has a base 60 for mounting on a fixed support 62 adjacent to an edge of conveyor 28. A pair of slides 64, 66 are secured to base 60 by screws 68 (FIG. 2) and extend upwardly adjacent to the edge of conveyor 28. Slides 64, 66 are parallel to each other, and are longitudinally spaced with respect to each other in the direction of movement of conveyor 28, as best seen in FIG. 3. A first bracket subassembly 70 includes a plate 72 having a pair of spaced linear bearings 74, 76 that slidably embrace slides 64, 66 respectively. An arm 78 is cantilevered to extend outwardly from plate 72 over the edge of conveyor 28. A roller 80 is freely rotatably mounted on the end of arm 78 remote from plate 72 and extends downwardly from the lower edge of arm 78, as best seen in FIG. 2. A pair of coil springs 82, 84 are captured in compression between bearings 74, 76 and caps 86, 88 secured to the upper ends of slides 64, 66 respectively. Thus, springs 82, 84 urge bracket subassembly 70 downwardly with respect to slides 64, 66 and base 60 to bring the periphery of roller 80 into rolling engagement with the upper surface of conveyor 28.

Figure 6:
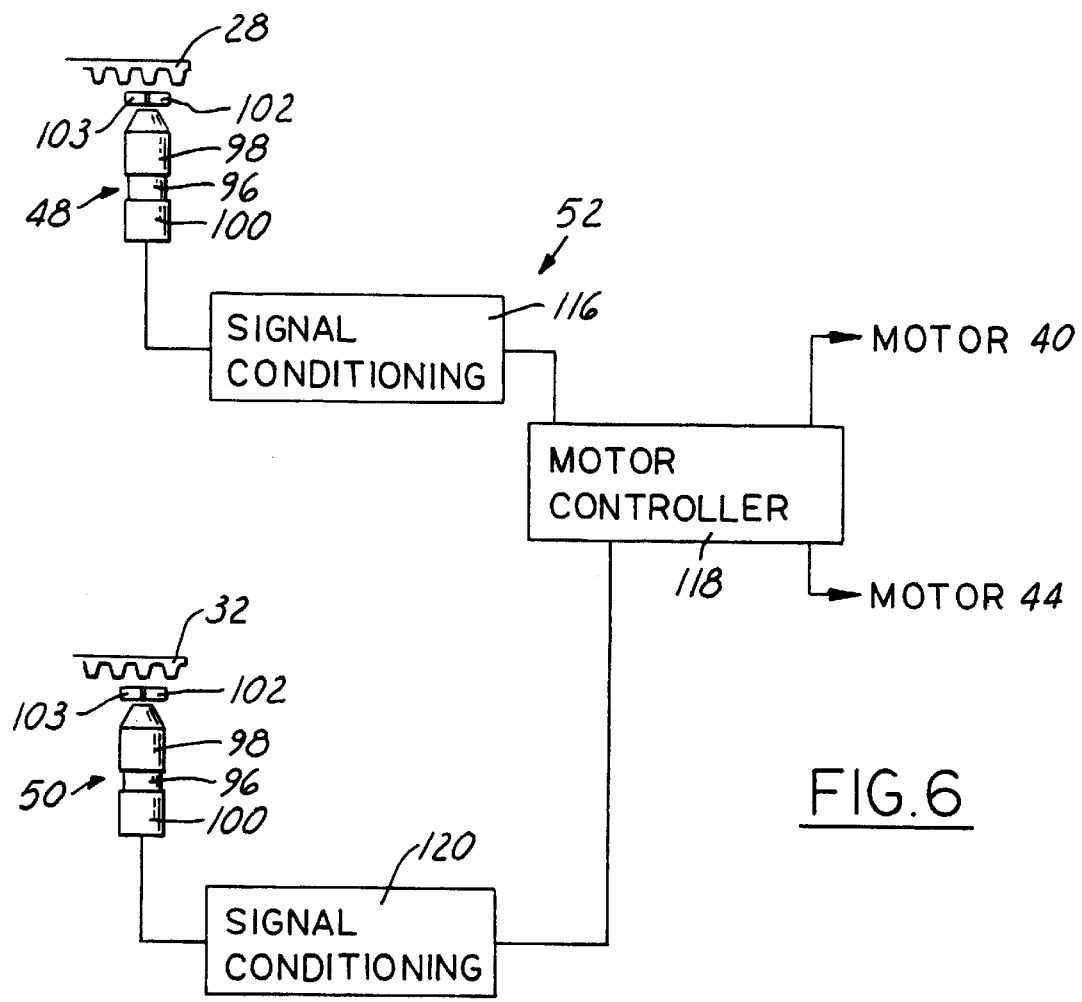
FIG. 6 is an electrical schematic diagram of the speed sensors and conveyor motor control electronics in the system of FIG. 1.

A second bracket subassembly 90 includes an L-shaped arm 94 affixed to and suspended from plate 72 of first bracket subassembly 70. An electromagnetic assembly 92 is mounted on the end of arm 94 so as to be positioned beneath the upper reach of conveyor 28. Electromagnetic assembly 92 includes a permanent magnet 96 disposed between an axially aligned pair of ferromagnetic flux concentrator plugs 98, 100. At least one Hall effect sensor 102, and preferably a pair of Hall effect sensors 102, 103 are disposed adjacent to the tapering upper end of plug 98 beneath conveyor 28. As best seen in FIG. 4, Hall sensors are at fixed spacing with respect to each other in the direction of motion of linear conveyor 28. Magnet 96, concentrator plugs 98, 100 and Hall effect sensors 102, 103 are mounted within a protective housing of insulator blocks 104, 106, 108. Electrical wires 110 extend from sensors 102, 103 through a conduit 112 on arm 94, and thence to an electrical connector 114 for connection to motor controller 118 (FIG. 6). Thus, the entire bracket assembly 59 that includes subassemblies 70, 90 "floats" with respect to base 60 at conveyor 28 for following vertical movement of the conveyor, due to wear at plate 58 or otherwise, while maintaining constant spacing between electromagnetic assembly 92 (and Hall sensors 102, 103) beneath the teeth of conveyor links 54.

As illustrated in FIG. 6, Hall sensors 102, 103 of speed sensor 48 associated with machine conveyor 28 are connected within controller 52 through a signal conditioning circuit 116 to a motor controller 118. Likewise, sensors 102, 103 of speed sensor 50 associated with cross conveyor 32 are connected through a signal conditioning circuit 120 to motor controller 118. Passage of the chain conveyor teeth above sensors 102, 103 causes an increase in the intensity of magnetic energy conveyed through the sensors, so that the Hall sensors provide periodic outputs to the associated signal conditioning electronics and motor controller 118 at frequencies determined by the velocity of passage of the chain link teeth above the sensors. Within signal conditioning circuits 116, 120, the sinusoidal signals from the sensors are fed through analog peak detectors to produce square wave signals that indicate when the edge of a tooth passes the respective sensors. Since the distance between the sensors is fixed and known, the velocity of the conveyor can be readily determined. Motor controller 118 is responsive to such signals for determining linear velocity at each conveyor, and controlling the speed of operation of the associated motor 40 or 44 to maintain a desired substantially constant velocity at each conveyor. Motors 40, 44 may be of any suitable type, as described in above-referenced U.S. Pat. No. 6,076,654. An air passage 122 (FIG. 2) extends through arm 78 of speed sensor 48 (and speed sensor 50). Air passage 122 terminates in a fitting 123 (FIG. 4) disposed between bearings 74, 76. A valve 124 is responsive to controller 118 for periodically directing air through the links of conveyor 28 (and 32) to blow off any magnetic particles that may have accumulated on the upper surface of insulator block due to magnetic attraction to magnet 96.

Figure 10:
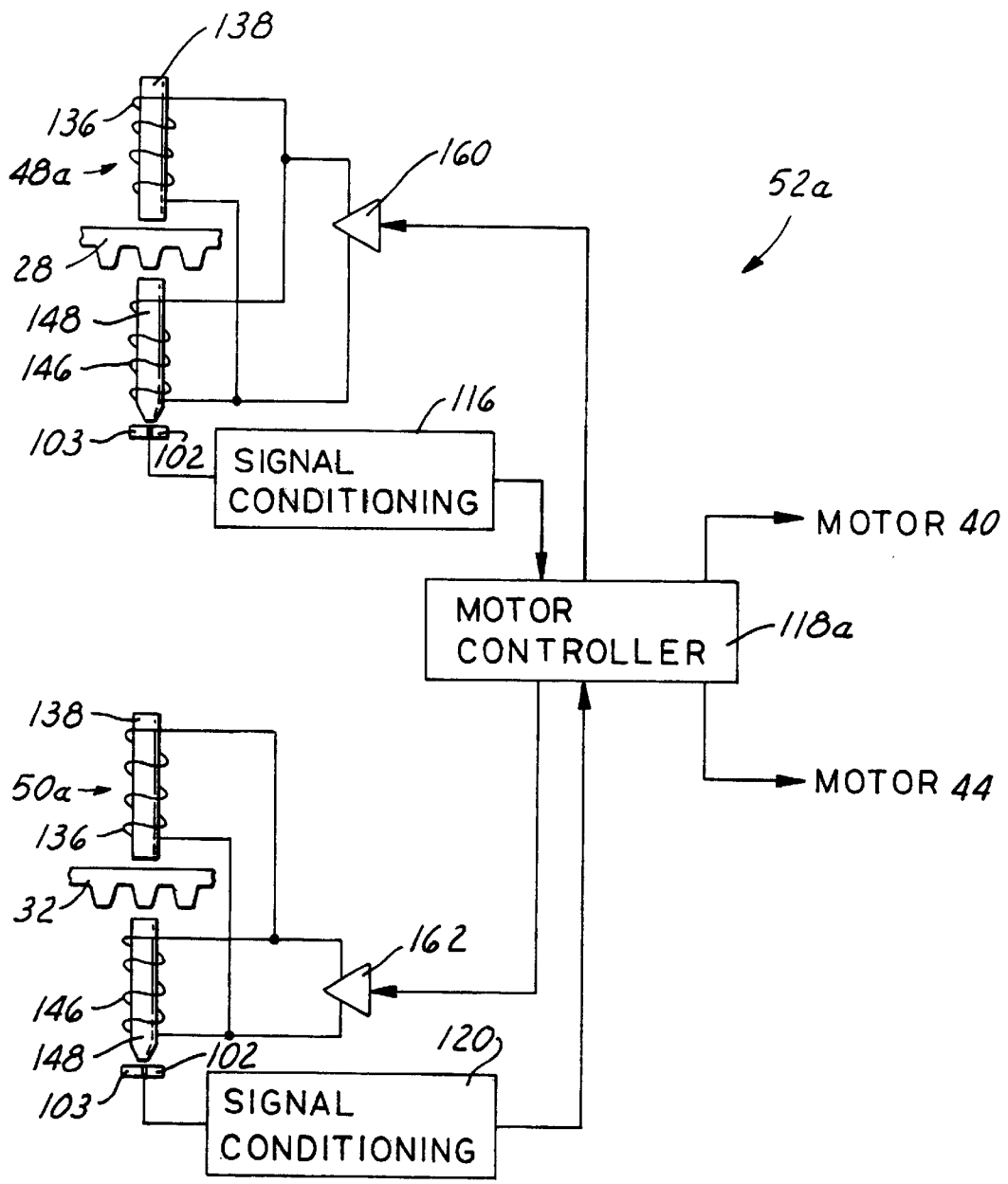
FIG. 10 is an electrical schematic diagram of a glass machine system embodying the speed sensor illustrated in FIGS. 7–8.

FIGS. 7–10 illustrate a modified speed sensor and motor control electronics in accordance with the present invention. Reference numerals identical to those in FIGS. 1–6 indicate identical components, and related components are indicated by identical reference numerals followed by the suffix "a." FIGS. 7–8 illustrate a modified second bracket subassembly 90*a* as including a lower electromagnetic assembly 130 carried by arm 94, and an upper electromagnetic assembly 132 carried by a cantilevered L-shaped arm 134. Upper assembly 132 includes an electrical coil 136 and a ferromagnetic pole piece 138 that together form an electromagnetic for directing magnetic energy through conveyor 28 to assembly 130. Coil 136 has a pair of leads 140 that extend through a conduit 142 to an electrical connector 114*a*. Assembly 130 (FIGS. 7–9) includes a second coil 146 and a pole piece 148 that form a second electromagnet. Pole piece 148 tapers toward its lower end and is disposed adjacent to a pair of Hall sensors 102, 103 carried by a circuitboard 150. Coil 146 is connected by leads 152 to circuitboard 150. Conductors 154 extend from circuitboard 150 through conduit 112 to connector 114*a* for connection to controller 52*a* (FIG. 10). Subassembly 90*a* is mounted on a spring-biased upper bracket assembly of the type illustrated in FIGS. 2–4 for following vertical movement of the conveyor due to plate and conveyor wear, etc. while maintaining constant spacing between the upper and lower surfaces of the conveyor and the respective electromagnetic assemblies. This embodiment may include longitudinally spaced rollers 80 disposed on opposite sides of arm 134.

Electromagnet coils 136, 146 of speed sensors 48*a*, 50*a* are connected to associated amplifiers 160, 162 of a controller 52*a* (FIG. 10) for suitably energizing the electromagnets. Hall sensors 102, 103 of the respective speed sensors are connected through associated signal conditioning electronics 116, 120 to motor controller 118*a*, which controls operation at motors 40, 44 to maintain desired constant linear speed at the conveyors, as previously described. Thus, the embodiment of FIGS. 7–10 replaces the permanent magnet 96 in the embodiment of FIGS. 2–6 with an associated electromagnet, and positions electromagnets both above and below the conveyor for enhanced sensitivity.

There has thus been disclosed a glass machine system, and particularly a glassware linear conveyor speed sensor, that fully satisfies all of the objects and aims previously set forth. The invention has been disclosed in conjunction with presently preferred embodiments thereof, and a number of modifications and variations have been discussed. Other modifications and variations will readily suggest themselves to persons of ordinary skill in the art in view of the foregoing description. The invention is intended to embrace all such modifications and variations as fall within the spirit and broad scope of the appended claims.

What is claimed is:

1. A glass machine system that includes:

a glassware manufacturing machine for manufacturing articles of glassware and transferring such articles to a linear conveyor, at least one linear conveyor for receiving and transporting such articles from the machine, and a speed sensor for monitoring linear speed of the conveyor comprising:

a magnetic energy source, a magnetic energy sensor, bracketry mounting said energy source and said energy sensor adjacent to said conveyor, said conveyor affecting magnetic energy coupling between said energy source and said energy sensor as said conveyor passes adjacent to said speed sensor, and circuitry responsive to signals from said energy sensor for determining speed of said conveyor, said conveyor having teeth along an undersurface thereof for engaging a pulley to drive said conveyor, passage of said teeth affecting magnetic coupling between said energy source and said energy sensor, said bracketry including first bracketry for mounting in fixed position adjacent to said conveyor, and second bracketry movable mounted on said first bracketry for maintaining a fixed spacing between said energy sensor and said conveyor teeth, said second bracketry including at least one roller in rolling engagement with an upper surface of said conveyor, said magnetic energy sensor being suspended beneath said conveyor by said second bracketry.

2. The system set forth in claim 1 wherein said second bracketry is mounted on longitudinally spaced vertical slides on said first bracketry.

3. The system set forth in claim 2 wherein said bracketry further includes resilient springs between said first bracketry and said second bracketry urging said second bracketry downwardly and said at least one roller into engagement with said conveyor.

4. The system set forth in claim 3 wherein said second bracketry includes an air passage for directing air through the conveyor onto said sensor to remove metallic particles from said sensor.

5. The system set forth in claim 3 wherein said magnetic energy source comprises a magnet and said magnetic energy sensor comprises a Hall effect sensor, both of which are mounted in an assembly beneath said conveyor.

6. The system set forth in claim 5 wherein said magnet comprises a permanent magnet.

7. The system set forth in claim 5 wherein said magnet comprises an electromagnet coupled to said circuitry.

8. The system set forth in claim 7 wherein said sensor further comprises a second electromagnet coupled to said circuitry, carried by said second bracketry and disposed above said conveyor in vertical alignment with said energy sensor.

9. The system set forth in claim 5 wherein said assembly further includes a magnetic energy concentrator for concentrating magnetic energy passage through said Hall effect sensor.

10. The system set forth in claim 1 further comprising an electric motor coupled to said pulley and connected to said circuitry for maintaining a constant linear speed at said conveyor.

* * * * *